Sept. 23, 1941.  VAN HAMM WILSHIRE  2,256,916
METHOD OF LAMINATING PAPER
Filed July 12, 1938

INVENTOR
Van Hamm Wilshire
Maréchal & Noe
ATTORNEY

Patented Sept. 23, 1941

2,256,916

UNITED STATES PATENT OFFICE 2,256,916

METHOD OF LAMINATING PAPER

Van Hamm Wilshire, Dayton, Ohio, assignor to The Specialty Papers Company, Dayton, Ohio, a corporation of Ohio Application July 12, 1938, Serial No. 218,779

2 Claims. (Cl. 154—40)

This invention relates to the manufacture of laminated paper material, the present application being a continuation in part of my prior application Serial No. 730,851 filed June 16, 1934, for Laminated paper, now Patent 2,123,760.

One object of the invention resides in the method of making a laminated sheet of paper which is substantially greaseproof and waterproof or moistureproof and in which wax coatings are applied in a controlled manner to opposite sides of separate sheets of paper which are then joined together while the wax is hot to unite the same into a single laminated sheet.

Another object of the invention resides in the method of making a laminated paper sheet as above set forth, one of the paper sheets in the laminated material being of a wax absorbent character and this sheet being passed around heated rolls to provide a prolonged heating effect for absorption of surface wax into the body of that sheet, during the course of the manufacture of the laminated product.

Other objects and advantages of the invention will be apparent from the following description, the appended claims and the accompanying drawing, in which:

Figure 1:
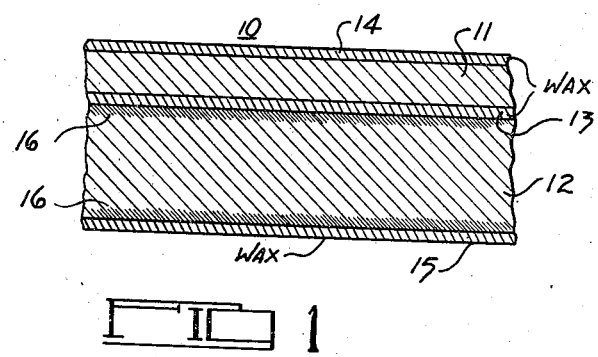
Fig. 1 is a sectional view on a greatly enlarged scale showing the laminated material made in accordance with the present invention.

Referring more particularly to the drawing by reference numerals, 10 generally designates a laminated sheet of material, as shown more particularly in Fig. 1 which is drawn to a greatly enlarged scale, the material 10 comprising a sheet of substantially greaseproof paper 11 which is held to a sheet of wax absorbent paper 12 by an intermediate thin layer of wax 13. One or both sides of the material 10 are provided with a surface coating or coatings of wax as indicated at 14 and 15.

The sheet 12 is a wax absorbent paper, preferably a calendered or high-finish sulphite, opaque paper capable of taking up wax which is absorbed for some distance into the surface of the paper as indicated at 16. This sheet may weigh, for example, about 50 pounds or less to a ream of 480 sheets size 24" x 36" although the weight or thickness may be somewhat varied depending upon the particular service desired. A sheet of this type and weight has a thickness of about .0035".

The sheet of substantially greaseproof paper 11 is preferably somewhat thinner and not as bulky as the wax absorbent sheet. This sheet 11 should be practically non-absorbent of paraffin and other wax and oils and is preferably a sheet that weighs about 20 pounds to a ream of 24" x 36" sheets although this weight may be somewhat greater than this depending upon the particular service required.

The two sheets 11 and 12 are held together by a layer of paraffin. The surface layer 14 on the substantially greaseproof sheet is a comparatively thin, continuous coating of paraffin and the outer layer 15 on the sheet 12 is also a continuous coating of paraffin.

Figure 2:
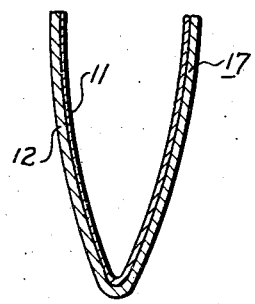
Fig. 2 is a sectional view through a portion of a container constructed of the laminated material.

The sheet of substantially greaseproof paper 11 may be a glazed, substantially transparent piece of thin paper made from pulp that has been very extensively beaten and thoroughly hydrated and then supercalendered, such paper being known as "glassine" paper, and being used where a bag or container formed from the laminated sheet is adapted to be used for edibles containing volatile oils the flavor and aroma of which should be preserved over a long period of time. This laminated material may be used to form a bag as indicated at 17 in Fig. 2, with the glassine sheet 11 inside and the wax absorbent sheet 12 on the outer side. This laminated material excludes extraneous undesirable odors, flavors or aromas, the inside wax layer 14 immediately preventing the passage of moisture and being effective in sealing the sides of the bag together at the filling end. The layers 13 and 15 likewise prevent water or moisture from obtaining access to the edible food products in the bag from the outside. The substantially greaseproof paper 11 effectively resists any loss of the volatile oil constituents of the food product which would otherwise penetrate and be absorbed by the sheet 12. The comparatively bulky or thicker sheet of paper 12 gives adequate strength to the laminated material particularly at the crease lines, and reinforces and protects the thinner sheet 11.

Where the laminated material is to be used for covering food products such as those which contain a considerable water content, the substantially greaseproof sheet 11 may be a vegetable parchment sheet, which is a tough paper of rather low finish, made from rags, or a sulphite spruce sheet treated with sulphuric acid, as is well understood in the trade. This type of paper in the laminated product made in accordance with the present invention is of advantage under conditions where a considerable degree of strength is required even when the sheet is moist or wet.

Figure 3:
Fig. 3 is a diagrammatic view showing the method of manufacture in accordance with the present invention.

Fig. 3 shows diagrammatically the method of manufacture of the laminated product. The substantially greaseproof sheet 11 is supplied under a submerging roll 20 in a paraffin tank 21, the level of the hot paraffin in the tank being indicated at 22. As the sheet travels rapidly through the hot paraffin bath it is given a continuous but comparatively thin surface coating on both sides. The paraffin, however, is not impregnated into this sheet but is merely applied to its outer surfaces due to the greaseproof character of the sheet. The sheet 12 of wax absorbent paper is supplied under a submerging roll 23, passing through the hot paraffin to which both sides of the sheet are exposed, and then passes around heated rolls which subject this sheet to a prolonged heating effect for absorption of the surface wax into the body of the sheet and to limit the amount of wax on the surface. As shown in Fig. 3, the sheet 12 after flowing into the molten wax in the tank travels around opposite sides of the superposed rolls 24 and 25 so that about one-half of each of these rolls is covered. After passing around the roll 24 and between the nip of the rolls 24 and 25 and then around the roll 25, the sheet passes between the nip of cooperating pressure rolls 25 and 26, the roll 26 being held down under suitable pressure towards the roll 25 so that as the two sheets 11 and 12 pass through the nip of these rolls, while the wax is hot, they are firmly pressed together and the surface wax on the adjacent sides of the two sheets is united while air is excluded from between the sheets. The laminated sheet 10 is then taken from between the rolls 25 and 26 and passed in contact with suitable cooling rolls.

In accordance with the method as above set forth, the total wax content of a laminated sheet material may be of the order of 18 pounds per ream. A sufficient amount of wax is absorbed in the sheet 12 and applied to the surface of that sheet to render it substantially waterproof, although an excessive amount of wax is not absorbed by the sheet since the wax is confined more or less on and in the surface because of its comparatively smooth or calendered character.

While the method herein described constitutes a preferred embodiment of the invention, it is to be understood that the invention is not limited to this precise method and that changes may be made in it without departing from the scope of the invention which is defined in the appended claims.

What is claimed is:

1. The method of making a laminated sheet of waxed paper adapted for contact with edibles comprising applying a hot coating of wax on both sides of a thin sheet of substantially greaseproof paper, concomitantly applying a hot coating of wax to both sides of a thicker sheet of wax absorbent paper, the application of the wax coatings to the sheets being accomplished by passing both sheets into the same body of heated wax, moving the coated wax absorbent sheet around heated rolls providing a prolonged heating effect first on one side of the sheet and then on the other for absorption of surface wax into the body of such sheet, and pressing the combined sheets between coacting pressure rolls while the wax is hot to unite the two sheets together.

2. The method of making a laminated sheet of waxed paper comprising passing a thin sheet of substantially grease-proof paper into hot wax with both sides of the sheet exposed to the wax, concomitantly passing a sheet of wax absorbent paper into hot wax with both sides of the sheet exposed to the wax, passing the sheets together through the nip of pressure rolls while the wax on the sheets is hot to unite them, and running the wax absorbent sheet in a serpentine path around heated rolls providing a prolonged heating effect first on one side of the sheet and then on the other so that, before it passes with the substantially greaseproof paper through the nip of the pressure rolls and after passing into the hot wax, its side forming an exposed surface of the laminated sheet is in prolonged direct contact with a heated roll causing absorption of surface wax into the body of the sheet.

VAN HAMM WILSHIRE.